United States Patent
Oishi (10) Patent No.: US 12,073,590 B2
(45) Date of Patent: Aug. 27, 2024

(54) IMAGE ENCODING APPARATUS, CONTROL METHOD THEREOF, AND NON-TRANSITORY COMPUTER-READABLE STORAGE MEDIUM

(71) Applicant: CANON KABUSHIKI KAISHA, Tokyo (JP)

(72) Inventor: Akihiro Oishi, Kanagawa (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 524 days.

(21) Appl. No.: 17/392,401

(22) Filed: Aug. 3, 2021

(65) Prior Publication Data
US 2022/0058831 A1 Feb. 24, 2022

(30) Foreign Application Priority Data
Aug. 18, 2020 (JP) .................. 2020-138187

(51) Int. Cl.
*G06T 9/00* (2006.01)
*H04N 25/11* (2023.01)

(52) U.S. Cl.
CPC ............ *G06T 9/00* (2013.01); *H04N 25/11* (2023.01)

(58) Field of Classification Search
CPC ........ G06T 9/00; H04N 25/11; H04N 19/186; H04N 19/63; H04N 25/133; H04N 9/67
See application file for complete search history.

(56) References Cited

U.S. PATENT DOCUMENTS

| | | | |
|---|---|---|---|
| 6,154,493 A | 11/2000 | Acharya et al. | |
| 8,314,850 B2* | 11/2012 | Negishi | H04N 25/42 348/240.99 |
| 11,770,541 B2* | 9/2023 | Lee | H04N 19/105 375/240.24 |
| 11,893,924 B2* | 2/2024 | Mandle | G02F 1/133514 |
| 2011/0292087 A1* | 12/2011 | Lim | G09G 3/3225 345/76 |
| 2016/0212315 A1* | 7/2016 | Watanabe | H04N 23/69 |
| 2016/0330414 A1* | 11/2016 | Takado | H04N 25/77 |
| 2017/0118491 A1* | 4/2017 | Togita | H04N 19/186 |
| 2019/0306517 A1* | 10/2019 | Ström | H04N 19/182 |
| 2020/0033482 A1* | 1/2020 | Negishi | G01J 1/44 |
| 2020/0288077 A1* | 9/2020 | Negishi | H04N 25/766 |

(Continued)

FOREIGN PATENT DOCUMENTS

| | | |
|---|---|---|
| JP | 2000244935 A | 9/2000 |
| JP | 2002516540 A | 6/2002 |
| JP | 2016213650 A | 12/2016 |

*Primary Examiner* — Bobbak Safaipour
(74) *Attorney, Agent, or Firm* — ROSSI, KIMMS & McDOWELL LLP (57) ABSTRACT

The invention provides an image encoding apparatus operable to encode data obtained by an image capturing sensor in which a filter for detecting a fourth color is periodically arranged in addition to filters of three primary colors, where the apparatus comprises a generating unit configured to generate data that approximates the fourth color using data of at least two colors among three colors, which represent three primary colors, obtained by the image capturing sensor and generate difference data that represents a difference between the generated data and data of the fourth color; and an encoding unit configured to encode data of the three colors which represent three primary colors and the difference data.

9 Claims, 6 Drawing Sheets (56) References Cited

U.S. PATENT DOCUMENTS

| | | | |
|---|---|---|---|
| 2020/0304745 A1* | 9/2020 | Sato | H04N 25/75 |
| 2021/0168345 A1* | 6/2021 | Izuta | H04N 23/74 |
| 2023/0003927 A1* | 1/2023 | Jiao | H10K 59/35 |

* cited by examiner

| Lv2LL | Lv2HL | Lv1HL |
|---|---|---|
| Lv2LH | Lv2HH | |
| Lv1LH | | Lv1HH |

FIG. 5

|   | ... | i-1 | i | i+1 | ... |
|---|---|---|---|---|---|
|   | R W | R W | R W | R W | ...... |
| j-1 | G B | G B | G B | G B | |
| j | R W | R W | R W | R W | |
| j+1 | G B | G B | G B | G B | |
|   | R W | R W | R W | R W | |
|   | G B | G B | G B | G B | |

IMAGE ENCODING APPARATUS, CONTROL METHOD THEREOF, AND NON-TRANSITORY COMPUTER-READABLE STORAGE MEDIUM

BACKGROUND OF THE INVENTION

Field of the Invention

The present invention relates to an image encoding apparatus, a control method thereof, and a non-transitory computer-readable storage medium.

Description of the Related Art

Image capturing apparatuses typified by digital cameras perform DeBayer processing (demosaicing processing) on raw image information (RAW image) captured by an image capturing sensor, convert it into signals consisting of luminance and color difference, and perform so-called development processing such as noise reduction, optical distortion correction, and image correction on each signal. Then the image capturing apparatuses compress and encode the luminance signals and the color difference signals obtained by development processing and then store the result as an image file in a storage medium such as a memory card.

Meanwhile, there are image capturing apparatuses capable of storing RAW images. A RAW image, although the amount of data required for storage is large, has the closest image quality to the original image immediately after obtainment by an image capturing sensor. Consequently, there is an advantage that since a RAW image is an image without degradation due to computational loss in development processing and the like, it is possible to perform sophisticated editing. Accordingly, high level users prefer to use RAW image storage.

In image capturing sensors, pixels of three primary colors, red (R), green (G), and blue (B), are periodically arranged. In particular, an arrangement in which one red pixel, one blue pixel, and two green pixels for each 2×2 pixels is a set and this set is periodically arranged is commonly called a Bayer array, and image capturing apparatuses employ this Bayer array image capturing sensor.

Literature (Japanese Patent Laid-Open No. 2016-213650) describes a configuration of using white (W) as a fourth type of pixel in order to reduce occurrence of moire and pseudo colors and prevent resolution from degrading.

However, RAW image data obtained by the technique of the above literature is configured by four types of independent pixels. In other words, there is no pixel data with a high correlation such as the two green pixels as in the Bayer pattern. Consequently, there is a problem such as a decrease in compression and encoding efficiency and an increase in the amount of encoded data.

SUMMARY OF THE INVENTION

The present invention was made in in view of the above problems, and provides a technique for improving encoding efficiency of a RAW image having a fourth color in addition to three primary colors.

According to an aspect of the invention, there is provided an image encoding apparatus operable to encode data obtained by an image capturing sensor in which a filter for detecting a fourth color is periodically arranged in addition to filters of three primary colors, the apparatus comprising: a generating unit configured to generate data that approximates the fourth color using data of at least two colors among three colors, which represent three primary colors, obtained by the image capturing sensor and generate difference data that represents a difference between the generated data and data of the fourth color; and an encoding unit configured to encode data of the three colors which represent three primary colors and the difference data.

According to the present invention, it is possible to improve encoding efficiency of a RAW image having a fourth color in addition to three primary colors.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1:
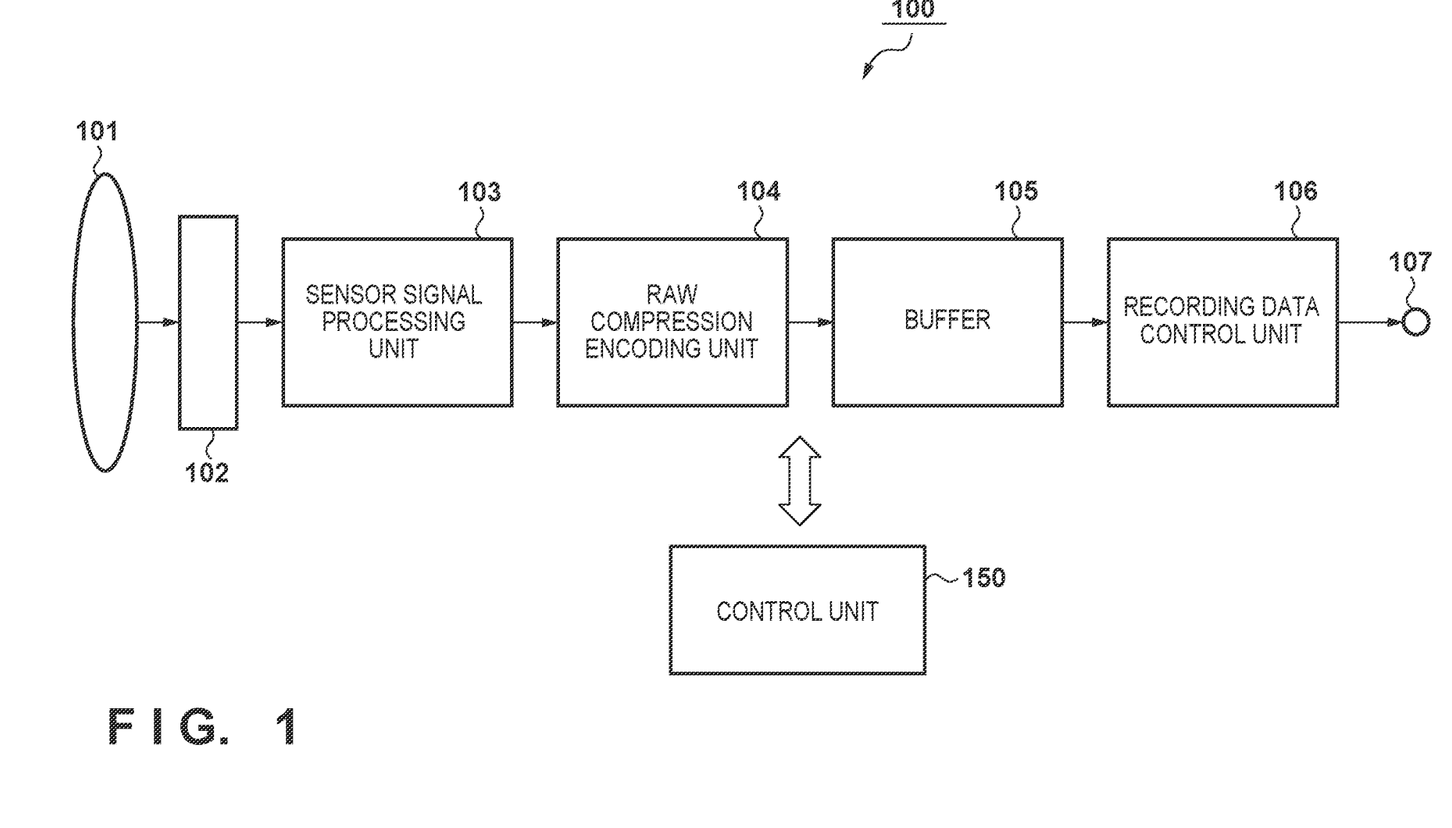
FIG. 1 is a block configuration diagram of an image capturing apparatus to which an embodiment is applied.

FIG. 1 is a block diagram illustrating an example of a configuration of an image capturing apparatus 100 in a first embodiment. In the first embodiment, an example in which the image encoding apparatus is implemented in an image capturing apparatus will be described; however, it is noted that image data to be encoded may be received via a storage apparatus or a network and that the present invention is not particularly limited to the image capturing apparatus.

The image capturing apparatus 100 comprises an image capturing optical unit 101, an image sensor unit 102, a sensor signal processing unit 103, a RAW compression encoding unit 104, a buffer 105, a recording data control unit 106, an output terminal 107, and a control unit 150 responsible for control of the entire apparatus. The control unit 150 includes a CPU, a ROM for storing programs that the CPU executes, and a RAM that is used as a work area.

In FIG. 1, an optical image is formed on the image sensor unit 102 via the image capturing optical unit 101. The control unit 150, when there is an input of an instruction to start an image capture operation from an operation unit (not shown), controls the image sensor unit 102. The image sensor unit 102 detects the intensity of light transmitted via various kinds of color filters arranged on the surface thereof and obtains electrical signals.

Figure 2:
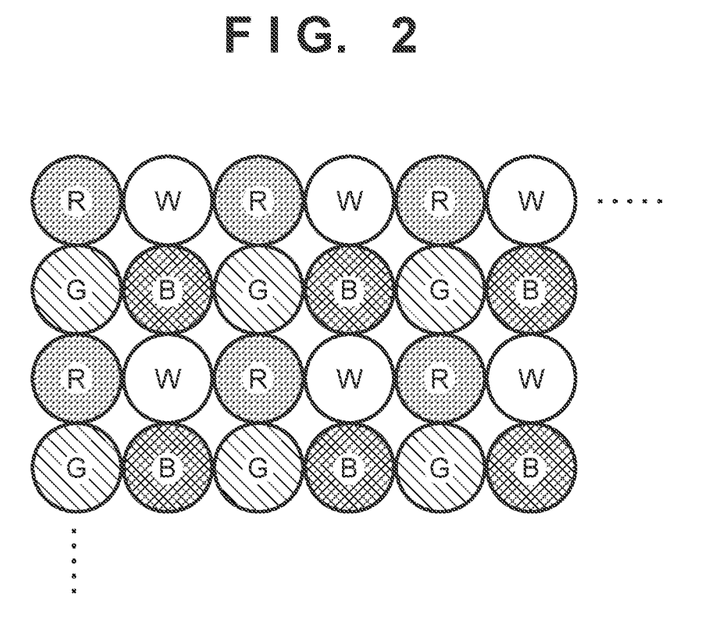
FIG. 2 is a view illustrating an example of a pixel arrangement.

FIG. 2 illustrates an array of color filters arranged on the image sensor unit 102 of the embodiment. Consequently, the same figure also illustrates a pixel arrangement of image data to be encoded. As illustrated in FIG. 2, white (W), red (R), green (G), blue (B) are arranged in a mosaic pattern for each pixel, and four (2×2) pixels are configured by one white pixel, one red pixel, one blue pixel, and one green pixel. Also, a configuration is taken such that these four (2×2) pixels are a set and this set is arranged periodically. Each RGB filter transmits their respective wavelength range; however, the white filter transmits a full range of visible light.

The electrical signals converted by the image sensor unit 102 are subjected to pixel restoration processing by the sensor signal processing unit 103. The restoration processing includes processing for interpolating a pixel to be restored using the values of the surrounding pixels, subtracting a predetermined offset value, and so on for missing or unreliable pixels in the image sensor unit 102. In the present embodiment, image information outputted from the sensor signal processing unit 103 will be called a RAW image or RAW image data meaning a raw (undeveloped) image.

The RAW image is supplied to the RAW compression encoding unit 104. The RAW compression encoding unit 104 performs a wavelet transform on the RAW image inputted from the sensor signal processing unit 103 and generates a plurality of pieces of subband data, which are frequency bands. Then the RAW compression encoding unit 104 quantizes coefficient data included in each piece of generated subband data, and by encoding it into a subband unit, generates encoded data. Then, the RAW compression encoding unit 104 stores in the buffer 105 each piece of subband encoded data that was generated. This encoding processing of the RAW compression encoding unit 104 is an important part of the present embodiment; accordingly, the details thereof will be described later.

The recording data control unit 106 is inputted with subband-based encoded data stored in the buffer 105, adds a predetermined header, and outputs the result to the output terminal 107 in order to store the result in a storage medium, an external storage apparatus, or the like.

Next, details of processing of the RAW compression encoding unit 104 in embodiment will be described.

Figure 3:
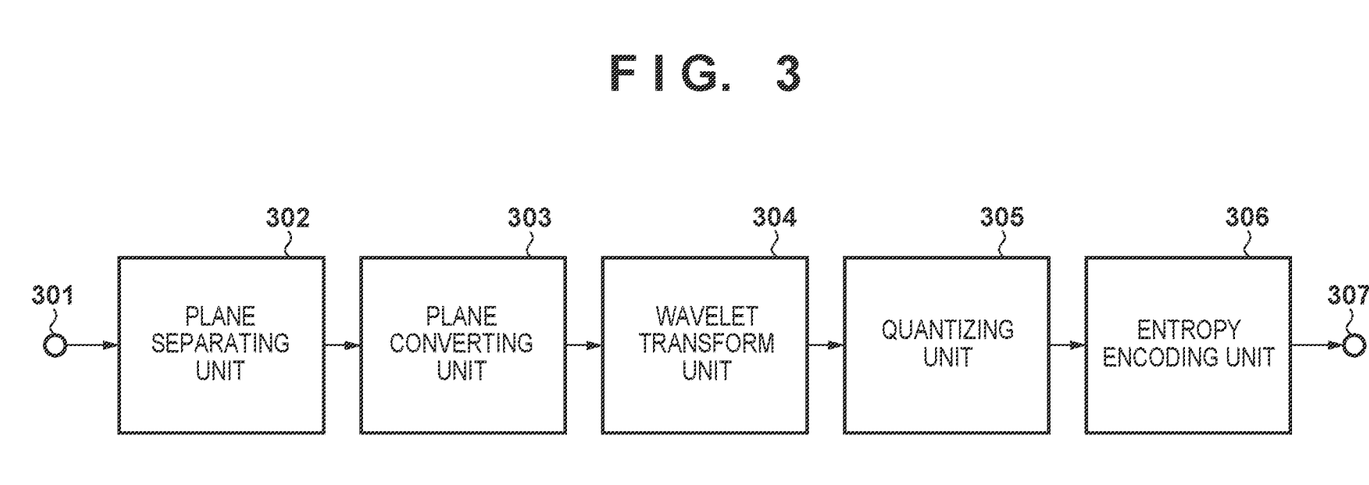
FIG. 3 is a block configuration diagram illustrating a configuration of a RAW compression encoding unit.

FIG. 3 is a block diagram illustrating a configuration of the RAW compression encoding unit 104. Processing of the RAW compression encoding unit 104 will be described using FIG. 3.

A plane separating unit 302 is inputted with RAW image data via an input terminal 301. The plane separating unit 302 generates from RAW image data four pieces of plane data, each configured by pixel data of a single component. RAW image data in the embodiment is configured by pixels of four components, W (white), R (red), G (green), and B (blue); accordingly, the plane separating unit 302 will generate four pieces (W, R, G, and B) of plane data from the RAW image data. In the embodiment, an arrangement of FIG. 2 is assumed; accordingly, each piece of plane data is of the same number of pixels and is ½ of the RAW image in the number of pixels in horizontal and vertical directions. The plane separating unit 302 supplies to a plane converting unit 303 each piece of generated plane data.

In the plane converting unit 303, plane data Y, which corresponds to a luminance component, is calculated in accordance with the following equation using the plane data R, G, and B.

$$Y = pr \times R + pg \times G + pb \times B \quad (1)$$

Here, the parameters, pr, pg, and pb, represent real number weighting coefficients and fulfill the following equation (2).

$$pr + pg + pb = 1 \quad (2)$$

Note that the parameters, pr, pg, and pb of Equation (2) can employ what is specified in, for example, ITU-R BT.601.

The plane data Y, which corresponds to a luminance component, calculated by Equation (1) has a high correlation with plane data W. Consequently, it can be said that the plane data Y is a plane data that approximates the plane data W.

In order to perform data reduction using a correlation between Y, which corresponds to a luminance component, and white (W), it is necessary to perform gain adjustment. Accordingly, $$Yg = Y \times ygain \quad (3)$$

gain adjustment is performed using the above calculation. However, a preset, arbitrary integer is used for ygain. Also, a gain value, in a case where feedback is possible due to continuous shooting and the like, may be $$ygain = Wavg/Yavg$$

using a W average value (Wavg) and a Y average value (Yavg) of the entire screen.

The plane converting unit 303 obtains a white/luminance difference plane WH using the above gain-adjusted Yg in accordance with the following Equation (4).

$$WH = W - Yg \quad (4)$$

As previously described, the plane data W and the plane data Yg have a high correlation. Accordingly, most pixel values (more precisely, pixel difference values) that constitute difference plane data WH, although they comprise positive and negative signs, will be values that are close to zero; therefore, it is possible to expect high compressibility.

The plane converting unit 303 supplies to a wavelet transform unit 304 the plane data WH calculated as described above and the plane data R, B, and G. The order in which they are supplied does not particularly matter; however, the plane data WH is generated using the plane data R, G, and B. Consequently, in order to minimize waiting time of the wavelet transform unit 304, it is advantageous to supply the plane data WH last.

The wavelet transform unit 304 generates a transform coefficient by transforming the inputted plane data to a frequency-domain signal.

Figure 4:
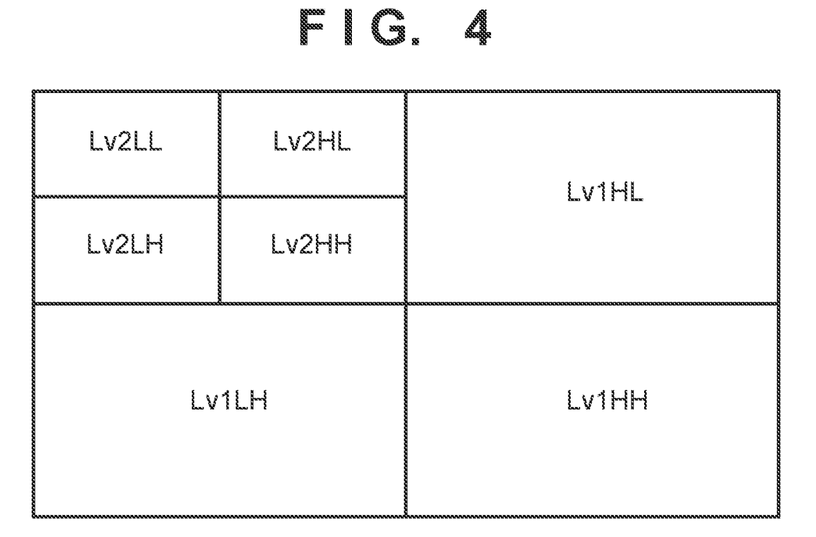
FIG. 4 is a subband formation diagram of a decomposition level 2 of a wavelet transform (DWT).

FIG. 4 is a subband formation diagram in a case of a decomposition level 2, which is a case where vertical and horizontal filtering of Discrete Wavelet Transform (DWT) has been performed twice. "Lv", in the figure, including the number that follows indicates a decomposition level, and "L" represents a low frequency band and "H" represents a high frequency band. In wavelet transform, filtering in two directions, horizontal and vertical, is a set; accordingly, subbands are expressed with two letters, L and H.

Subbands LL, HL, LH, and HH are obtained by a first wavelet transform (decomposition level 1 transform). Then, in a case of performing the second and subsequent (decomposition level 2 and higher) wavelet transform, the subband LL obtained in the last transform is targeted. In other words, wavelet transform may recursively execute the subband LL obtained in the last transform. Accordingly, regardless of the number of instances of wavelet transform, there will be one subband LL. Also, as wavelet transform is performed, granularity of frequency decomposition will become finer as in FIG. 4. There is no particular limitation to the number of times wavelet transform is executed; however, wavelet transform by the wavelet transform unit 304 in the present embodiment will be assumed to be performed twice as illustrated in FIG. 4.

The wavelet transform unit 304 performs wavelet transform twice on each plane data WH, R, B, and G. Then, the wavelet transform unit 304 generates a decomposition level 2 subband for each plane data WH, R, G, and B and supplies it to a quantizing unit 305.

The quantizing unit 305 quantizes transform coefficients included in a subband of each plane data using a preset quantization parameter for each subband and supplies to an entropy encoding unit 306 the quantized transform coefficients. The entropy encoding unit 306 entropy encodes the quantized transform coefficients supplied by the quantizing unit 305 and outputs the result to the buffer 105 via an output terminal 307. The type of entropy encoding, although it does not particularly matter, may be, for example, Golomb coding, Huffman encoding, or the like.

Figure 6:
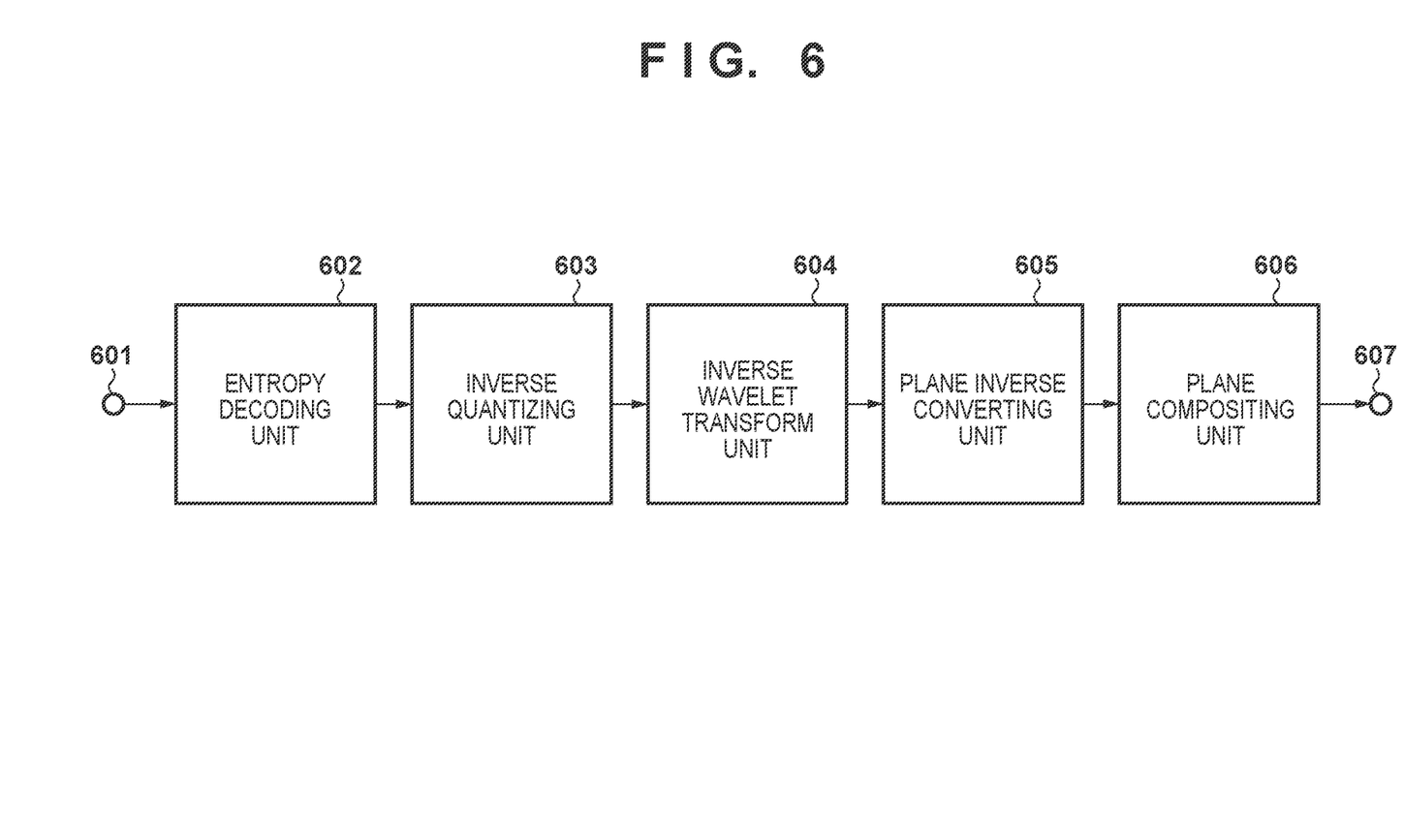
FIG. 6 is a block diagram of RAW compression decoding.

Next, a decoding side will be described. FIG. 6 is a block diagram of a decoding apparatus. Decoding processing will be described in accordance with FIG. 6.

Encoded data inputted from an input terminal 601 is supplied to an entropy decoding unit 602. The entropy decoding unit 602 performs entropy decoding processing and supplies to an inverse quantizing unit 603 data (corresponds to quantized transform coefficients) obtained by that encoding processing. The inverse quantizing unit 603 inverse quantizes the data inputted from the entropy decoding unit 602 in accordance with a quantization parameter set for each subband and supplies to an inverse wavelet transform unit 604 the inverse-quantized data (corresponds to a wavelet transform coefficient). The inverse wavelet transform unit 604 performs inverse wavelet transform processing on data inputted from the inverse quantizing unit 603. As a result of this, plane data WH', R', G', and B' is outputted as decoded plane data from the inverse wavelet transform unit 604. A plane inverse converting unit 605 is inputted with the plane data WH', R', G', and B' from the inverse wavelet transform unit 604. Then the plane inverse converting unit 605 calculates plane data Y', which represents a luminance Y' in accordance with the following Equation (5) from the plane data R', G', and B'.

$$Y'=pr \times R'+pg \times G'+pb \times B' \qquad (5)$$

Next, the plane inverse converting unit 605 calculates gain-adjusted plane data Yg'.

$$Yg'=Y' \times \text{ygain}$$

However, a value used in Equation 3 is used for "gain".

Then, the plane inverse converting unit 605 calculates, in accordance with the following Equation (6), plane data W' from the plane data Yg' and the plane data WH' obtained via decoding.

$$W'=WH'+Yg' \qquad (6)$$

The plane inverse converting unit 605 supplies to a plane compositing unit 606 the plane data W' calculated as described above and the plane data R', G', and B' obtained by the decoding processing.

The plane compositing unit 606 composites the plane data W', R', G', and B' and generates one RAW image data.

As described above, generating and then encoding the plane data WH, in which the amount of information has been reduced, rather than the plane data W itself makes it possible to improve RAW image encoding efficiency and further reduce the amount of encoding.

Figure 5:
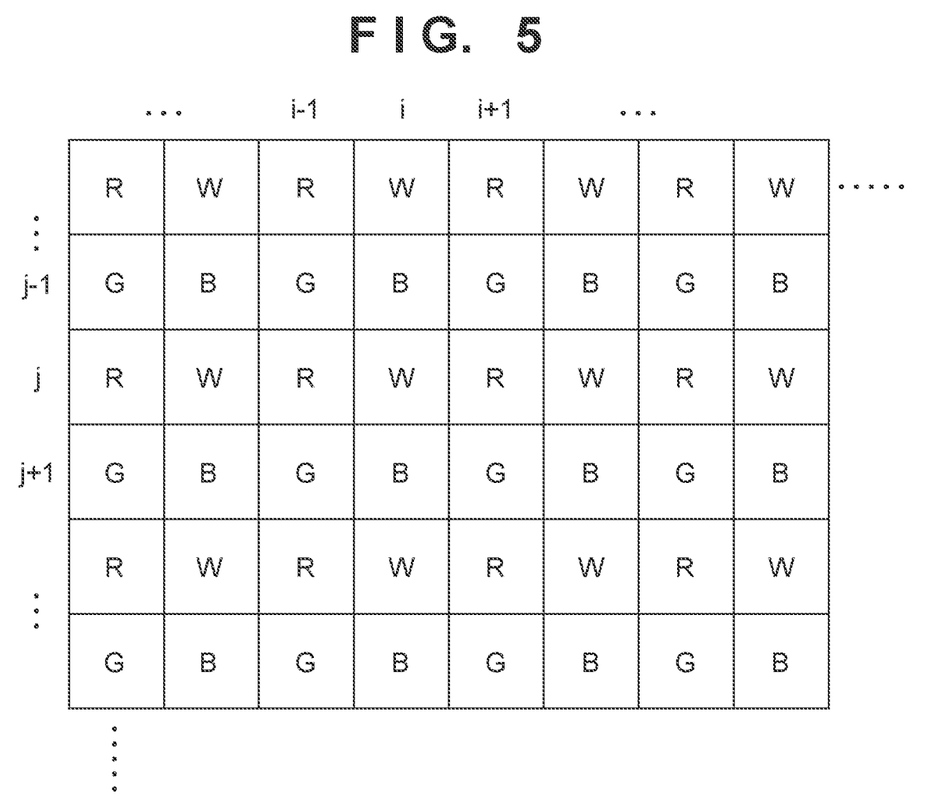
FIG. 5 is a view illustrating a pixel arrangement.

FIG. 5 is a pixel arrangement that is the same as the arrangement of FIG. 2 with addresses assigned.

In Equation (1), a simple calculation equation was indicated. Assume that when a horizontal coordinate of plane data "P" (P is R, G, B, W, and the like) is i and a vertical coordinate is j, a pixel value of a coordinate (i, j) of the plane data P is expressed as P[i][j]. In such a case, Y[i][j] for reducing information of WNW may be obtained using the following Equation (6a).

$$Y[i][j]=pr^*(R[j][i-1]+R[j][i+1])/2+pg^*(G[j-1][i-1]+ \\ G[j-1][i+1]+G[j+1][i-1]+G[j+1][i+1])4+pb^*(B \\ [j-1][i]+B[j+1][i])/2 \qquad (6a)$$

Also Equation (2) may be transformed into the following Equation (2') and Equations (1), (2), and (3) may be combined as the following Equation (1').

$$Yg=pr \times R+pg \times G+pb \times B \qquad (1')$$

Furthermore, what has been multiplied by a white balance gain may be used for parameters pr, pg, and pb.

Figure 7:
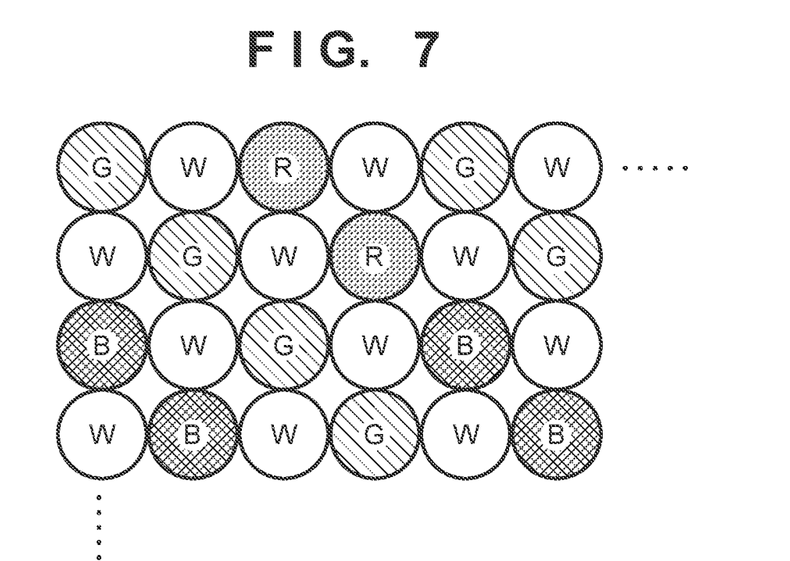
FIG. 7 is a view illustrating an example of another pixel arrangement.

Note that in the description of the present embodiment, description was given using an example of the pixel arrangement of FIG. 2; however, the present invention can be applied in the same manner even in an arrangement such as in FIG. 7 and in other arrangements that were not described so long as an arrangement is a combination of three primary colors, R, G, and B, and white.

Second Embodiment

A second embodiment will be described. A configuration of an apparatus in the second embodiment will be the same as in FIG. 1 in the first embodiment.

Figure 8:
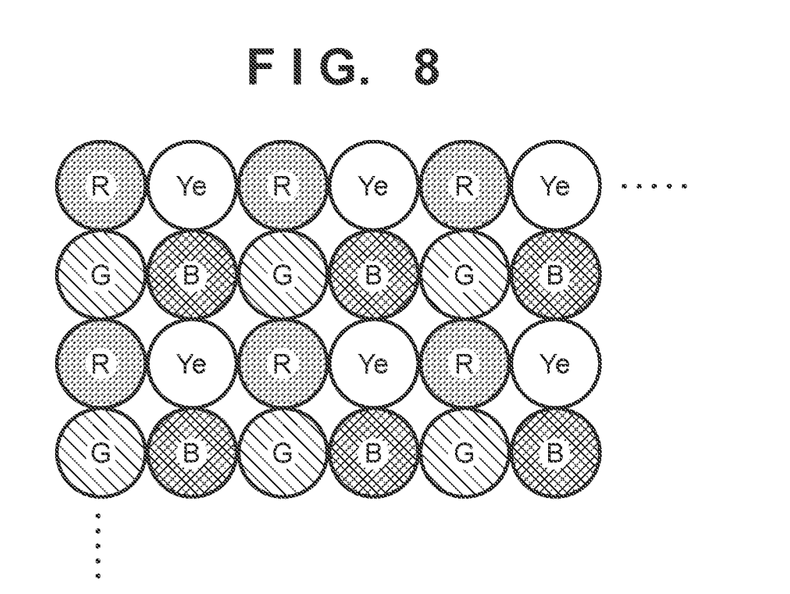
FIG. 8 is a view illustrating a pixel arrangement in a second embodiment.

FIG. 8 is an example of a color filter arranged in the image sensor unit 102 in the second embodiment and is a different arrangement from FIG. 2. In FIG. 8, yellow (Ye), red (R), green (G), blue (B) are arranged in a mosaic pattern for each pixel, and a configuration is such that for each four (2×2) pixels, one yellow pixel, one red pixel, one blue pixel, and one green pixel are a set and this is periodically arranged.

Processing of the plane converting unit 303 in a case where the pixel arrangement is that of the above FIG. 8 is as follows.

The plane converting unit 303 calculates in accordance with the following Equation (7) plane data Yw, which is a mixed color of the plane data R and G among the plane data R, G, and B and corresponds to a yellow component.

$$Yw=sr \times R+sg \times G \qquad (7)$$

However, a relationship between the parameters sr and sg is as follows in the following Equation (8).

$$sr+sg=1 \qquad (8)$$

Here, in general, sr =sg.

The plane data Yw, which was calculated by Equation (7) and corresponds to a yellow component, is data that is highly correlated to yellow (Ye).

However, in order to perform data reduction using a correlation between plane data Yw, which corresponds to a yellow component, and yellow (Ye), it is necessary to perform gain adjustment. Accordingly, the plane converting unit 303 obtains plane data Ywg that has been gain adjusted in accordance with the following Equation (9).

$$Ywg = Yw \times yegain \quad (9)$$

Here, yegain uses a preset, arbitrary integer.

The plane converting unit 303 obtains plane data YeH, which represents a difference, in accordance with the following Equation (10) using the above gain-adjusted plane data Ywg.

$$YeH = Ye - Ywg \quad (10)$$

As described above, plane data YeH in which information of the plane data Ye has been reduced is generated.

The plane converting unit 303 supplies to the wavelet transform unit 304 the plane data YeH calculated as described above and the three primary color plane data R, B, and G. Hereinafter is the same as in the first embodiment.

As described above, generating the plane data YeH in which the amount of information has been reduced from the plane data Ye and then encoding it makes it possible to further improve Raw image encoding efficiency and reduce the amount of encoding.

In the above embodiments, white and yellow were given as examples of colors other than the three primary colors; however, a mixed color that can be expressed in at least two or more colors among the three primary colors is sufficient.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-138187, filed Aug. 18, 2020, which is hereby incorporated by reference herein in its entirety.

What is claimed is:

1. An image encoding apparatus operable to encode data obtained by an image capturing sensor including a filter for detecting a fourth color periodically arranged in addition to filters of three primary colors, the apparatus comprising:
a controller, including a memory storing instructions and a processor, that executes the instructions to:
generate data that approximates the fourth color using data of at least two colors among three colors, which represent the three primary colors, obtained by the image capturing sensor;
adjust a gain of the generated data that approximates the fourth color;
generate difference data that represents a difference between the adjusted generated data where the gain thereof has been adjusted and data of the fourth color obtained by the image capturing sensor; and
encode data of the three colors representing the three primary colors and the generated difference data.

2. The apparatus according to claim 1, wherein the at least two colors comprises the three colors.

3. The apparatus according to claim 1, wherein the controller adjusts the gain based on a ratio of an average value of the generated data that approximates the fourth color and an average value of the data of the fourth color.

4. The apparatus according to claim 1, wherein:
the controller executes the instructions to divide data obtained by the image capturing sensor into a plurality of pieces of plane data each configured by pixel data of a single component,
the generated difference data is plane data of the difference data that represents the difference between the adjusted generated data and the data of the fourth color, and
the controller encodes plane data of the three colors representing the three primary colors, and the generated difference data.

5. The apparatus according to claim 4, wherein the controller, in encoding the plane data of the three colors and the generated difference data:
generates a plurality of subbands from the generated difference data;
quantizes coefficient data included in each subband; and
entropy encodes the quantized coefficient data.

6. The apparatus according to claim 1, wherein the fourth color is white or yellow.

7. The apparatus according to claim 1, further comprising the image capturing sensor.

8. A method of controlling an image encoding apparatus operable to encode data obtained by an image capturing sensor including a filter for detecting a fourth color periodically arranged in addition to filters of three primary colors, the method comprising:
generating data that approximates the fourth color using data of at least two colors among three colors, which represent the three primary colors, obtained by the image capturing sensor;
adjusting a gain of the generated data that approximates the fourth color;
generating difference data that represents a difference between the adjusted generated data where the gain thereof has been adjusted and data of the fourth color obtained by the image capturing sensor; and
encoding data of the three colors representing the three primary colors and the generated difference data.

9. A non-transitory computer-readable storage medium storing a program executable by a computer to execute a method of controlling an image encoding apparatus operable to encode data obtained by an image capturing sensor including a filter for detecting a fourth color periodically arranged in addition to filters of three primary colors, the method comprising:
  generating data that approximates the fourth color using data of at least two colors among three colors, which represent the three primary colors, obtained by the image capturing sensor;
  adjusting a gain of the generated data that approximates the fourth color;
  generating difference data that represents a difference between the adjusted generated data where the gain thereof has been adjusted and data of the fourth color obtained by the image capturing sensor; and
  encoding data of the three colors representing the three primary colors and the generated difference data.

* * * * *